US011061107B1

(12) United States Patent
Nguyen et al.

(10) Patent No.: US 11,061,107 B1
(45) Date of Patent: Jul. 13, 2021

(54) SYSTEM AND METHOD FOR INTERCEPTING AN EXO-ATMOSPHERIC TARGET USING PASSIVE RANGING ESTIMATION

(71) Applicant: RAYTHEON COMPANY, Waltham, MA (US)

(72) Inventors: Huy P. Nguyen, Waltham, MA (US); Elliot Schwartz, Waltham, MA (US); Eric Blake, Waltham, MA (US); Pradyumna Kannan, Waltham, MA (US)

(73) Assignee: Raytheon Company, Waltham, MA (US)

( * ) Notice: Subject to any disclaimer, the term of this patent is extended or adjusted under 35 U.S.C. 154(b) by 542 days.

(21) Appl. No.: 15/946,063

(22) Filed: Apr. 5, 2018

(51) Int. Cl.
*G01S 7/02* (2006.01)
(52) U.S. Cl.
CPC .................................. *G01S 7/021* (2013.01)
(58) Field of Classification Search
CPC ...................................................... G01S 7/021
USPC .......................................................... 342/13
See application file for complete search history.

(56) References Cited

U.S. PATENT DOCUMENTS

| 3,789,410 A | | 1/1974 | Smith et al. | |
| 5,282,013 A | | 1/1994 | Gregoris | |
| 5,867,256 A | * | 2/1999 | Van Rheeden | G01C 3/22 356/4.03 |
| 6,714,155 B1 | | 3/2004 | Rose | |
| 8,502,128 B1 | * | 8/2013 | Streuber | F41G 7/226 244/3.16 |
| 8,655,614 B2 | * | 2/2014 | Murata | G01J 5/0022 702/66 |
| 9,212,869 B1 | * | 12/2015 | Boardman | G01S 3/783 |
| 9,341,705 B2 | * | 5/2016 | Yannone | G01S 5/0278 |
| 9,342,746 B1 | * | 5/2016 | Ganguli | G06K 9/3241 |
| 10,235,577 B1 | * | 3/2019 | Avadhanam | H04N 7/183 |
| 10,295,402 B2 | * | 5/2019 | Mercier | G01J 1/4228 |

(Continued)

OTHER PUBLICATIONS

Dikic et al. "Target Tracking with Passive IR Sensors" in TELSIKS 2001, Sep. 19-21, 2001, Nis, Yugoslavia. Algorithm and angle-only measurements from passive missile sensors using point IR detectors. (Year: 2001).*

(Continued)

*Primary Examiner* — Erin F Heard
*Assistant Examiner* — Alexander L. Syrkin
(74) *Attorney, Agent, or Firm* — Burns & Levinson, LLP; Joseph M. Maraia

(57) ABSTRACT

A target intercept system for guiding an interceptor to a target using passive ranging includes an EO/IR sensor that provides target azimuth and elevation angles, target irradiance, target area and target length. A dual Kalman Filter architecture is implemented where, prior to a target image becoming resolved, i.e., prior to endgame, a first Kalman Filter provides guidance as a function of target azimuth and elevation angles and target irradiance measurements. After the target image becomes resolved, i.e., at endgame, a second Kalman Filter provides guidance as a function of target azimuth and elevation angles, target area and, optionally, target length, instead. The dual Kalman Filter approach improves the estimates of time-to-go by optimizing the on-board EO/IR sensor measurements at the optimal times.

13 Claims, 9 Drawing Sheets

(56) References Cited

U.S. PATENT DOCUMENTS

| | | | |
|---|---|---|---|
| 2002/0180636 A1* | 12/2002 | Lin .......................... | G01S 5/04 |
| | | | 342/357.32 |
| 2011/0134249 A1* | 6/2011 | Wood ................... | G02B 26/101 |
| | | | 348/164 |
| 2014/0195150 A1* | 7/2014 | Rios .................... | G05D 1/0027 |
| | | | 701/469 |
| 2018/0266887 A1* | 9/2018 | Frank ................... | G03B 15/006 |

OTHER PUBLICATIONS

G. M. Koretsky et al.; "A Tutorial on Electro-Optical/Infrared (EO/IR) Theory and Systems;" Institute for Defense Analysis; Jan. 2013.

* cited by examiner

SYSTEM AND METHOD FOR INTERCEPTING AN EXO-ATMOSPHERIC TARGET USING PASSIVE RANGING ESTIMATION

GOVERNMENT RIGHTS

N/A

BACKGROUND

With modern threats becoming increasingly complex and agile, area-defense systems now include missiles with a GNC (Guidance, Navigation and Control) architecture to ensure success. One aspect of a known GNC architecture is a Passive Ranging Estimator for providing time-to-go ($t_{go}$) information to missile systems during a terminal phase of flight. Accurate time-to-go is critical for zero-effort miss (ZEM) based guidance laws in order to achieve a small miss distance and for enhancing lethality either by enabling a target detection device or by detonating a warhead at the proper time, i.e., the point of closest approach to the target.

There are known approaches such as that described in U.S. Pat. No. 6,714,155B1 for "Method Of Passively Estimating An Emitter's Position And Velocity Using Bearings-only Without Requiring Observer Acceleration," where passive ranging is performed with only angle measurements that do not require own-ship observability maneuvers.

U.S. Pat. No. 3,789,410 for "Passive Ranging Technique" describes a system for passively determining range to a target based upon the rate of change in phase difference between two signals received by widely separated pairs of antennas on an aircraft. The signals received by each antenna are identical in frequency but slightly different in phase due to the angle of intercept. It is the rate of the change in phase difference that yields the information required for passive ranging.

U.S. Pat. No. 5,282,013 for "Passive Ranging Technique For Infrared Search And Track (IRST) Systems" teaches that atmospheric transmittance and background spectral radiance is estimated from available meteorological data and then, at each scan of a sequence of consecutive scans, the contrast irradiance in the direction of a target is measured as well as the azimuth and elevation of the target. A target type is selected from a library of target types that store signatures for the target types when considering the measured contrast irradiance as well as the measure of the contrast irradiance of a previous scan (if any). The range of the target is then calculated considering the selected target type, the estimated atmospheric parameters and the measured contrast irradiance.

What is needed is an improved passive ranging estimator for providing guidance control in order to intercept the target.

SUMMARY

According to one aspect of the disclosure, a system for guiding an interceptor toward a target using passive ranging estimation comprises an EO/IR sensing device configured to detect the target and output corresponding target azimuth information target elevation information, target irradiance information, target length information, target area information and respective validity indicators; a passive ranging target state estimator, coupled to the EO/IR sensing device and configured to generate interceptor guidance information, comprising: a first Kalman Filter configured to generate the interceptor guidance information as a function of the target azimuth information, the target elevation information and the target irradiance information; and a second Kalman Filter configured to generate the interceptor guidance information as a function of the target azimuth information, the target elevation information and the target area information, wherein the first Kalman Filter is operative to generate the interceptor guidance information when the target irradiance information is indicated as being valid and the second Kalman Filter is operative to generate the interceptor guidance information when the target area information is indicated as being valid, and wherein the target area information and the target irradiance information are not indicated as being valid at a same time; and an interceptor guidance module, coupled to the passive ranging target state estimator, configured to control movement of the interceptor as a function of the generated interceptor guidance information.

In another aspect of the present disclosure, a method of guiding an interceptor toward a target using passive ranging estimation comprises: detecting the target with an EO/IR sensing device and outputting corresponding target azimuth information, target elevation information, target irradiance information, target length information, target area information and respective validity indicators; determining a range from the interceptor to the target as a function of one or more of: the target azimuth information, target elevation information, target irradiance information, target length information, target area information and respective validity indicators; generating interceptor guidance information by one of: when the determined range is greater than a first predetermined distance, implementing a first Kalman Filter configured to generate the interceptor guidance information as a function of the target azimuth information, the target elevation information and the target irradiance information; or when the determined range is less than or equal to the first predetermined distance, implementing a second Kalman Filter configured to provide the interceptor guidance information as a function of the target azimuth information, the target elevation information and the target area information; and controlling movement of the interceptor as a function of the generated interceptor guidance information.

In another aspect of the present disclosure, a system for guiding an interceptor toward a target using passive ranging estimation comprises: an EO/IR sensing device configured to detect the target with an EO/IR sensing device and output corresponding target azimuth information, target elevation information, target irradiance information, target length information, target area information and respective validity indicators; a passive ranging target state estimator coupled to the EO/IR sensing device configured to determine a range from the interceptor to the target as a function of one or more of: the target azimuth information, target elevation information, target irradiance information, target length information, target area information and respective validity indicators; the passive ranging target state estimator further configured to generate interceptor guidance information by one of: when the determined range is greater than a first predetermined distance, implementing a first Kalman Filter configured to generate the interceptor guidance information as a function of the target azimuth information, the target elevation information and the target irradiance information; or when the determined range is less than or equal to the first predetermined distance, implementing a second Kalman Filter configured to provide the interceptor guidance information as a function of the target azimuth information, the target elevation information and the target area information; and an interceptor guidance control module, coupled to the passive ranging target state estimator, configured to control movement of the interceptor as a function of the generated interceptor guidance information.

BRIEF DESCRIPTION OF THE DRAWINGS

Various aspects of the disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The Figures are provided for the purposes of illustration and explanation and are not intended as a definition of the limits of the disclosure. In the Figures.

DETAILED DESCRIPTION

Figure 1:
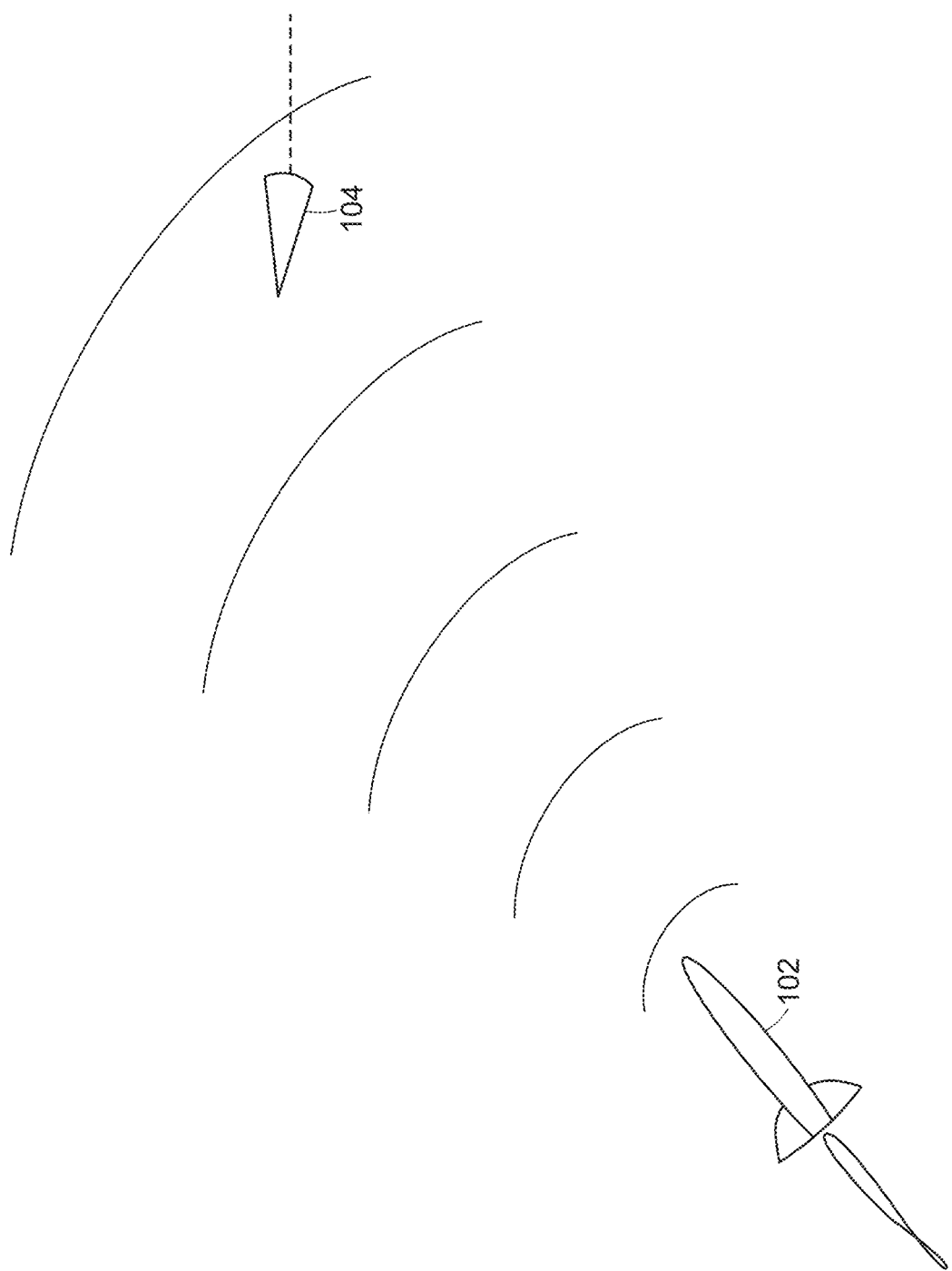
FIG. 1 is a conceptual representation of an interceptor pursuing a target.

Details are set forth in order to provide a thorough understanding of the aspects of the disclosure. It will be understood by those of ordinary skill in the art that these may be practiced without some of these specific details. In other instances, well-known methods, procedures, components and structures may not have been described in detail so as not to obscure the aspects of the disclosure.

Generally, and as will be described in more detail below, aspects of the present disclosure are directed to a system for implementing passive ranging determinations. In one non-limiting example, such a system can be used in a target intercept system where the target is, for example, an exo-atmospheric ballistic, non-maneuvering missile. The system may employ an EO/IR sensor to determine target azimuth and elevation angles, target irradiance and target area, as will be discussed in more detail below. Extended Kalman Filter (EKF) techniques are used in an implementation of the passive ranging of the present disclosure to provide a more accurate time-to-go determination than previously known.

In one approach, as described below, an aspect of the present disclosure uses a dual Kalman Filter architecture. A first Kalman Filter is implemented prior to endgame and a second Kalman Filter is implemented thereafter. Generally, as known to one of ordinary skill in the art, typically the "end game" is the phase in which the "discrimination" algorithms have identified the specific target to track and intercept. In other words, at this point, the system is focused on the one object to pursue.

Thus, prior to endgame, the first Kalman Filter processes target irradiance measurements to provide direction control toward the target. The irradiance measurements of a target, however, become poor and, therefore, provide less guidance accuracy, as the distance to the target becomes smaller. Advantageously, in accordance with an aspect of the present disclosure, after a target image has become resolved, i.e., at endgame, a second Kalman Filter is used to provide direction control by processing target area measurements and, optionally, target length measurements, instead of the target irradiance measurements. Thus, the guidance information is more accurate as the distance to the target becomes smaller in the endgame phase of target acquisition.

Advantageously, the dual Kalman Filter approach improves the estimates of time-to-go by optimizing the on-board EO/IR sensor measurements at the optimal times.

Further, aspects of the present disclosure improve on the traditional "bearings-only" passive ranging approach by incorporating irradiance, target area and, optionally, target length, measurements into the state estimate. In addition, the irradiance measurement bias is estimated and incorporated.

More effective passive ranging, per the present disclosure, provides accurate time-to-go ($t_{go}$) information to missile systems, particularly intercept systems, during the terminal phase of flight, thereby improving endgame performance, e.g., increasing miss distance accuracy.

Generally, referring to FIG. 1, the intention of a defense system is to have an interceptor 102, often a missile, intercept an incoming target 104, also often a missile. As is known, the interceptor 102 will include, among other elements, navigation systems, a flight control system and a tracking system.

Figure 2:
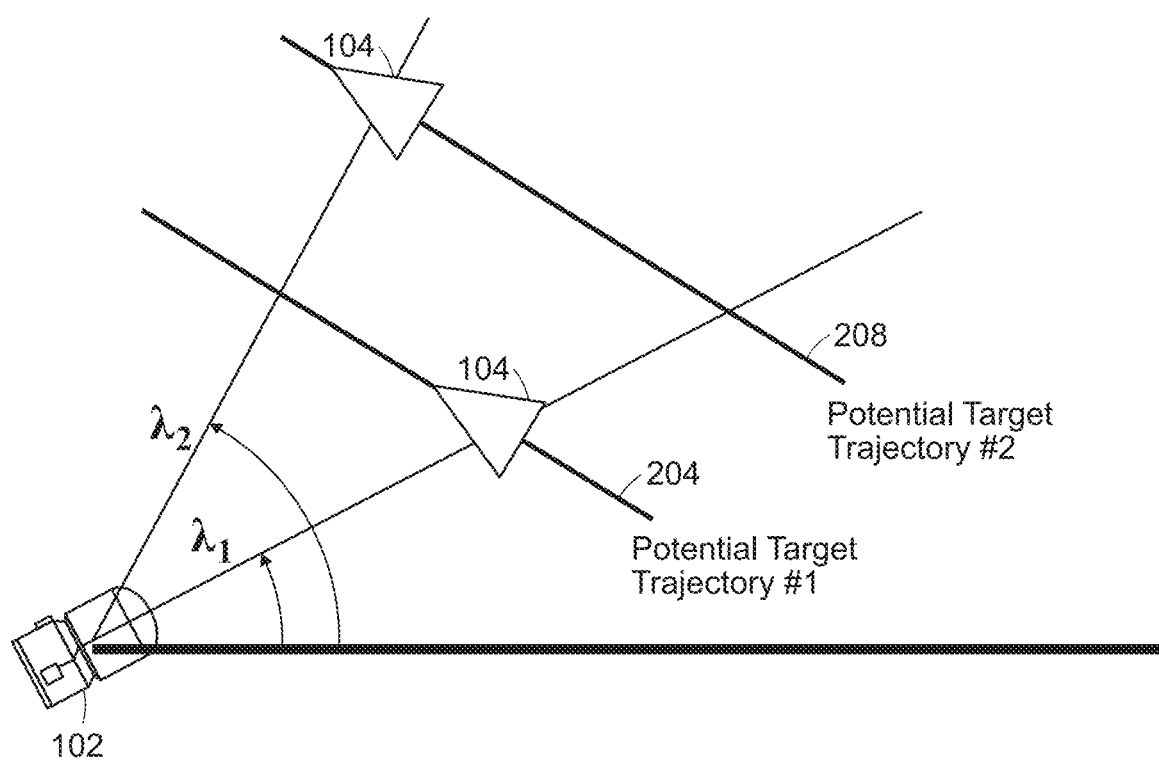
FIG. 2 is a representation of the passive ranging problem.

An issue with guiding an interceptor 102 on a collision course with the target 104 is referred to as the "passive ranging problem." As shown in FIG. 2, the interceptor 102, using an EO/IR sensor, will make two different line-of-sight (LOS) measurements at two different times, shown as being at angles $\lambda_1$ and $\lambda_2$. An issue arises in that these two LOS measurements could have come from either of the two trajectories 204, 208 depicted, noting that the range to the target 104 is ambiguous. Thus, the target 104 can either be closer to the interceptor 102 and moving relatively slowly or be farther away from the interceptor 102 and moving relatively quickly. One of ordinary skill in the art will understand that an infinite number of tracks can be generated by using only the LOS measurement angle sequence depicted in FIG. 2.

In one aspect of the present disclosure, representing an improved solution to the passive ranging problem, an improved passive ranging algorithm is implemented in a system, for example, a missile, employing an EO/IR sensor. More specifically, the system implements Kalman Filters that operate on target irradiance, target length, and target area measurements to improve over the traditional "bearings only" passive ranging approach that only uses target azimuth and elevation angle measurements. The Kalman Filters are utilized based on the phase of flight of the interceptor 102, i.e., how close to the target 104 or endgame, as will be described in more detail below.

Figure 3:
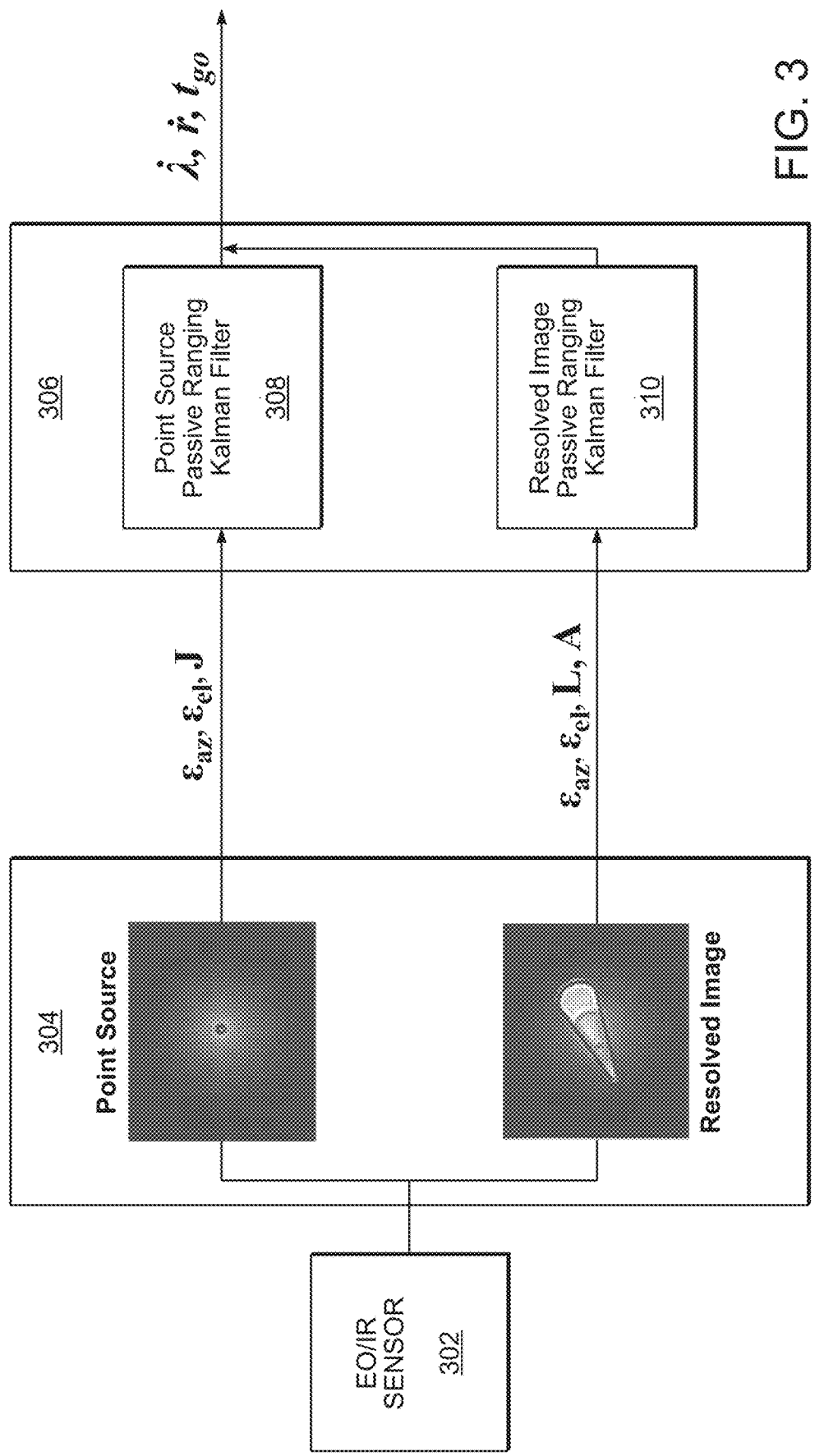
FIG. 3 is a functional block diagram of a system incorporating a passive ranging target state estimator in accordance with an aspect of the present disclosure.

Generally, as shown in FIG. 3, in accordance with an aspect of the present disclosure, an EO/IR sensor 302 provides signals representative of the target 104 to a signal processor 304. As known, the EO/IR sensor 302 comprises a plurality of sensing pixels. The signal processor 304, per known operations, processes the received signals from the EO/IR sensor 302. The signal processor 304 provides target azimuth information ($\varepsilon_{az}$), target elevation information ($\varepsilon_{el}$), target irradiance information (J), target length information (L) and target area information (A). The signal processor 304 also outputs a corresponding validity signal indicating the validity of each of the aforementioned information signals. The EO/IR sensor 302 and signal processor 304 are shown as separate elements for explanatory purposes only and one of ordinary skill in the art will understand that they may be combined into a single EO/IR sensing device.

When the target 104 is relatively far away from the interceptor 102 the EO/IR sensor 302 will detect the target 104 as a point source in that only one pixel of the sensor 302 is "lit up." In this situation, only the target azimuth information ($\varepsilon_{az}$), target elevation information (Ee) and target irradiance information (J) will be valid and identified as such. The remaining information signals will be indicated as not valid.

When the target 104 is relatively closer to the interceptor 104, and the signal processor 304 can validate a resolved image, the target azimuth information ($\varepsilon_{az}$), the target elevation information ($\varepsilon_{el}$), target length information (L) and target area information (A) are provided and indicated as being valid while the target irradiance information (J) is indicated as being not valid. In other words, the signal processor 304 indicates when the target 104 is detected as being a point source or that a resolved image of the target 104 has been obtained.

As is known, the EO/IR sensor 302 always provides irradiance and angle information. Thus, from relatively far away, as only one pixel is "lit up" then the target 104 presents as a point source. Once the target 104 is closer to the interceptor 102, then the target 104 becomes resolved and "fills up" more than one pixel. At this point, the sensor 302 provides valid angle, area and length measurements.

In one approach, the target image becoming resolved is defined as when the target projected area is greater than one pixel although one of ordinary skill in the art will understand that a different threshold number of pixels can be chosen. This is related to the time-to-go ($t_{go}$) and the physical size of the target 104. For example, a very large target, such as an aircraft carrier, will become resolved at a larger time-to-go ($t_{go}$) than a small target, such as a jet ski. Although it is highly unlikely that either of these two vehicles would be on an exo-atmospheric ballistic, non-maneuvering approach as the target 104 is contemplated herein[1].

[1] The inventors note that there may be other issues to deal with if either an aircraft carrier or a jet ski were approaching in such a fashion.

A passive ranging target state estimator 306, in accordance with an aspect of the present disclosure, receives the output information from the signal processor 304. The passive ranging target state estimator 306 includes a first Kalman Filter (KF) 308 that operates as a Point Source Passive Ranging Kalman Filter and a second Kalman Filter 310 that operates as a Resolved Image Passive Ranging Kalman Filter.

Accordingly, when the signal processor 304 indicates that the target 104 is far enough away that it appears as a point source, then the first KF 308 processes the target azimuth information ($\varepsilon_{az}$), target elevation information ($\varepsilon_{el}$), and target irradiance information (J) to provide the azimuth line-of-sight rate ($\dot{\lambda}_{az}$) and elevation line-of-sight rate ($\dot{\lambda}_{el}$), arange rate ($\dot{r}$) and a time-to-go value ($t_{go}$) for use in guiding the interceptor 102 toward the target 104.

When the signal processor 304 indicates that the target 104 is close enough to resolve an image, then the second KF 308 processes the target azimuth information ($\varepsilon_{az}$), target elevation information (se), the target area information A and, optionally, the target length information L, to provide the azimuth line-of sight rate and elevation line-of-sight rate $\dot{\lambda}_{az}$, $\dot{\lambda}_{el}$ the range rate of change ($\dot{r}$) and the time-to-go value ($t_{go}$) for use in guiding the interceptor 102 toward the target 104.

The azimuth and elevation line-of-sight rates ($\dot{\lambda}$), the range rate ($\dot{r}$) and the time-to-go value ($t_{go}$) are parameters that are needed for basic Proportional Navigation Guidance or basic Zero-Effort Miss Guidance used by exo-atmospheric interceptors, or missiles, to handle ballistic targets, as is known to one of ordinary skill in the art.

Thus, the presently described system determines when the range from the interceptor 102 to the target 104 is less than or equal to a predetermined distance, i.e., a distance where the EO/IR sensor 102 is no longer detecting it as a point-source. At that point, and thereafter, the second Kalman Filter is used to generate the guidance information.

Figure 4:
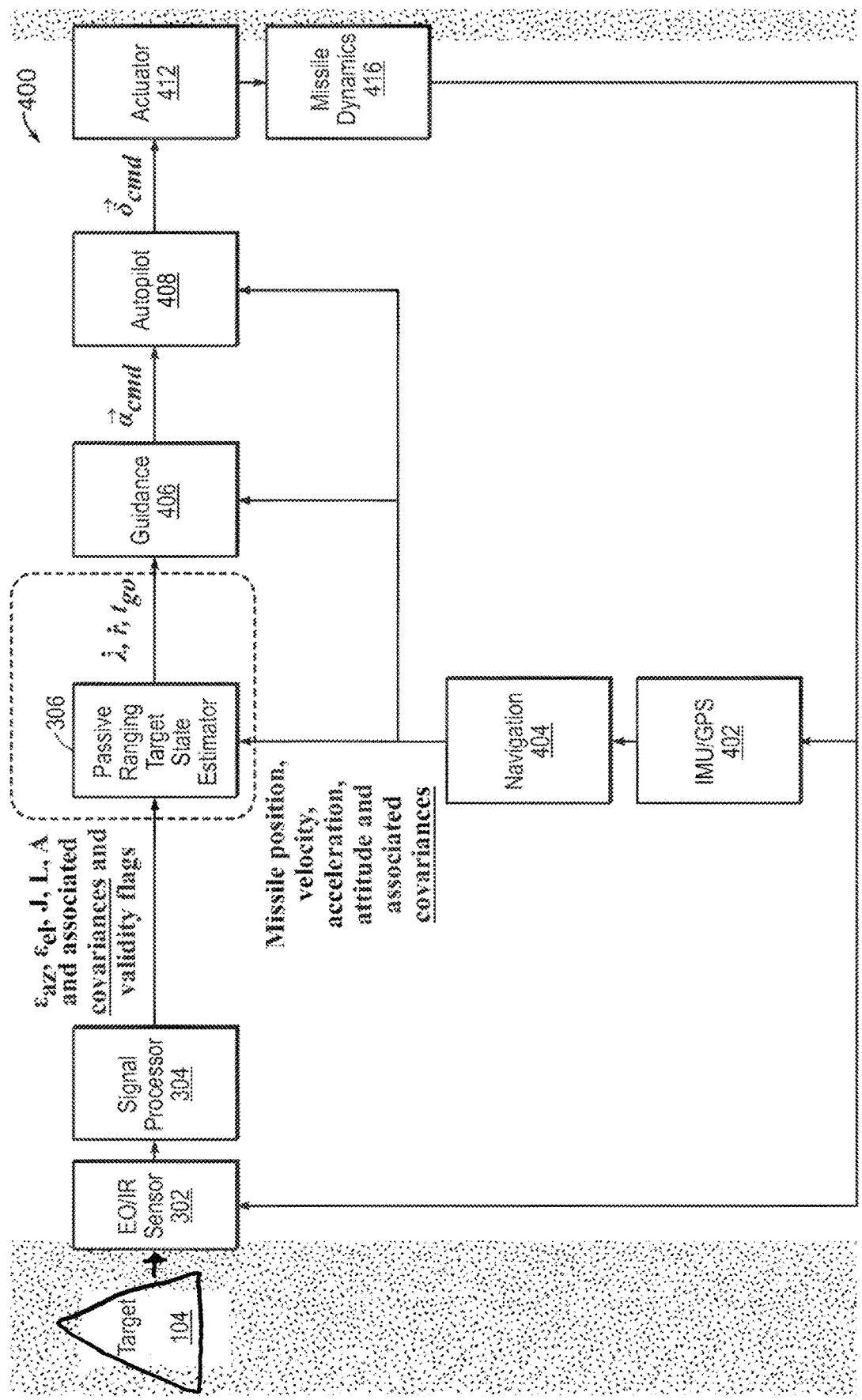
FIG. 4 is a functional block diagram of an interceptor incorporating the passive ranging target state estimator of FIG. 3.

A system 400 incorporating the state estimator 306 will now be discussed with respect to FIG. 4. Generally, the system 400 is provided within the interceptor 102 although it is envisioned that some components, and their respective functions, may be provided from outside of the interceptor 102.

As discussed above, the EO/IR sensor 302 detects the target 104 and provides information to the signal processor 304 which provides the information to the state estimator 306.

The system 400 includes a known inertial measurement unit/global positioning system (IMU/GPS) module 402 coupled to a navigation unit 404. In addition, a known guidance module 406, a known autopilot module 408, at least one known actuator 412 and a missile dynamics module 416 are included. Generally, IMU/GPS module 402, navigation unit 404, guidance module 406, autopilot module 408, actuator 412 and missile dynamics module 416 are components for operating the interceptor missile 102 but are not, otherwise, germane to the inventive aspects of the present disclosure.

The IMU/GPS module 402 and the EO/IR sensor 302 receive inputs from the missile dynamics module 416. The IMU/GPS module 402 provides missile position, velocity, acceleration, attitude and the associated covariances to the state estimator 306. As above, the state estimator 306 provides the control parameters to the guidance module 406 which provides data to the autopilot module 408 to then control the actuator module 412. The missile dynamics module 416 receives information from the actuator module 412 and the system 400 operates in a feedback loop.

As set forth above, the state estimator 306 implements the first and second Kalman Filters 308, 310.

The following is a discussion of the Kalman Filters where it should be noted that, in the present disclosure the following assumptions are present: the target is ballistic and non-maneuvering; any engagement has a short time of flight; the system is operating within a linear collision triangle engagement geometry; the time-to-go $t_{go}$ has a slope of −1; the change in closing velocity is very small ($\dot{R} \approx 0$); and the target intensity is constant.

Initially, an overview of the Kalman frame for passive ranging will be set forth here.

Figure 5:
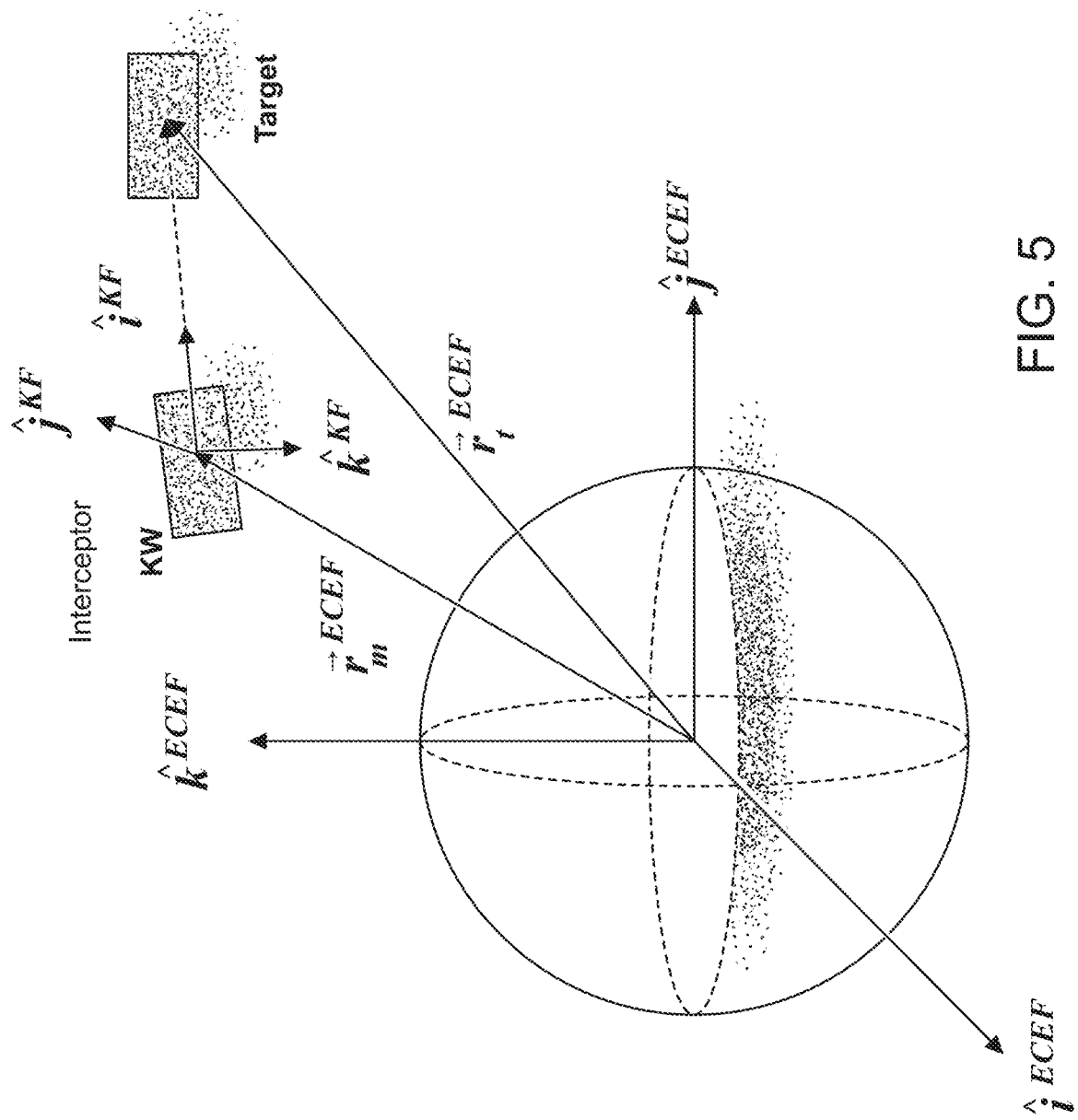
FIG. 5 is a graph of a Kalman Frame corresponding to an aspect of the present disclosure.

The Kalman frame, as shown in FIG. 5, is an "instantaneous" inertial reference frame to be used by the passive ranging algorithm described herein. An origin is initialized to an estimate of the interceptor 102 position taken from the navigation module 404.

After initialization, the Kalman frame is updated in order to translate with the interceptor 102 and maintain its rotation relative to the Earth-Centered Inertial (ECI) frame. The positive X axis of the Kalman frame lies on the vector from the interceptor's position to the interceptor's best estimate of the target's position. The positive Y axis is defined as the cross-product of the positive X axis in the Kalman frame and the missile position vector in the Earth-centered, Earth-fixed (ECEF) frame ([Kalman frame X-axis]X [ECEF missile position vector]). The positive Z axis is defined as the cross-product of the positive X and Y axes in the Kalman frame, thus completing a right-handed orthogonal coordinate system.

The (i, j, k) unit vectors are along the (x, y, z) axes, respectively, of a certain coordinate frame. So ($i^{ECEF}$, $j^{ECEF}$, $k^{ECEF}$) are unit vectors along the (x, y, z) axes of the ECEF frame and likewise for the Kalman frame. The ECI frame is the same frame as the ECEF frame at time=0. For t>0, the ECEF frame rotates but the ECI frame does not.

Accordingly, prior to an image of the target 104 becoming resolved, i.e., prior to endgame, the first Kalman Filter 308 incorporates target irradiance measurements J, which obeys the following physics where the irradiance J of an object at a distance R and intensity I is given by:

$$J = \frac{I}{R^2} \qquad \text{Eq. 1}$$

For Kalman filtering purposes, the derivative of Eq. 1 is also needed:

$$\frac{d}{dt}(J) = \dot{J} = \frac{\dot{I}}{R^2} - \frac{2I}{R^2}\frac{\dot{R}}{R} = \frac{\dot{I}}{R^2} - 2J\frac{\dot{R}}{R} \qquad \text{Eq. 2}$$

For a constant intensity model, $\dot{I}=0$. Therefore, any changes in irradiance are attributed to range closure. Furthermore, for a constant closing velocity condition ($\ddot{R}\approx 0$, $\dot{R}\approx -R t_{go}$), Eq. 2 can also be written as:

$$\dot{J} = 2J\frac{1}{t_{go}} \qquad \text{Eq. 3}$$

Advantageously, although a constant intensity target model is assumed, the algorithm achieves accurate $t_{GO}$ estimates even when presented with a non-constant intensity target.

After the target image becomes resolved (at endgame), the target irradiance measurements no longer obey Eq. 1

Thus, in order to maintain accurate $t_{GO}$ estimates at endgame, the second Kalman Filter 310 is used to incorporate the area measurement and, optionally, the target length.

Assuming a linear engagement at endgame, which is true if the interceptor 102 is on a collision course with the target 104, then the following relates measured target length and area at two points in time:

$$L = \frac{R_O L_O}{R} \qquad \text{Eq. 4}$$

$$A = \frac{R_O^2 A_O}{R^2} \qquad \text{Eq. 5}$$

For Kalman filtering purposes, the derivatives of Eq. 4 and 5 are also needed:

$$\frac{d}{dt}(L) = \dot{L} = -\frac{R_O L_O \dot{R}}{R^2} = \frac{L}{t_{go}} \qquad \text{Eq. 6}$$

$$\frac{d}{dt}(A) = \dot{A} = -\frac{2R_O^2 A_O \dot{R}}{R^3} = \frac{2A}{t_{go}} \qquad \text{Eq. 7}$$

The equations of motion for the first Kalman Filter 308 are as follows:

$$\vec{x} = [\lambda_{az} \ \dot{\lambda}_{az} \ \lambda_{el} \ \dot{\lambda}_{el} \ t_{go} \ \dot{r} \ J \ J_b]^T$$

$$\dot{\vec{x}} = \begin{bmatrix} \dot{\lambda}_{az} \\ \ddot{\lambda}_{az} \\ \dot{\lambda}_{el} \\ \ddot{\lambda}_{el} \\ \dot{t}_{go} \\ \ddot{r} \\ \dot{j} \\ \dot{j}_b \end{bmatrix} = \begin{bmatrix} \dot{\lambda}_{az} \\ \frac{2\dot{\lambda}_{az}}{t_{go}} - \frac{\eta M_{\perp,az}}{\dot{r} t_{go}} \\ \dot{\lambda}_{el} \\ \frac{2\dot{\lambda}_{el}}{t_{go}} - \frac{\eta M_{\perp,el}}{\dot{r} t_{go}} \\ -1 \\ 0 \\ 2J\frac{1}{t_{go}} \\ 0 \end{bmatrix} = \begin{bmatrix} x_2 \\ \frac{2x_2}{x_5} - \frac{\eta M_{\perp,az}}{x_6 x_5} \\ x_4 \\ \frac{2x_4}{x_5} - \frac{\eta M_{\perp,el}}{x_6 x_5} \\ -1 \\ 0 \\ 2x_7 \frac{1}{x_5} \\ 0 \end{bmatrix}$$

The equations of motion for the second Kalman Filter 310 are as follows:

$$\vec{x} = [\lambda_{az} \ \dot{\lambda}_{az} \ \lambda_{el} \ \dot{\lambda}_{el} \ t_{go} \ \dot{r} \ L \ A]^T$$

$$\dot{\vec{x}} = \begin{bmatrix} \dot{\lambda}_{az} \\ \ddot{\lambda}_{az} \\ \dot{\lambda}_{el} \\ \ddot{\lambda}_{el} \\ \dot{t}_{go} \\ \ddot{r} \\ \dot{L} \\ \dot{A} \end{bmatrix} = \begin{bmatrix} \dot{\lambda}_{az} \\ \frac{2\dot{\lambda}_{az}}{t_{go}} - \frac{\eta M_{\perp,az}}{\dot{r} t_{go}} \\ \dot{\lambda}_{el} \\ \frac{2\dot{\lambda}_{el}}{t_{go}} - \frac{\eta M_{\perp,el}}{\dot{r} t_{go}} \\ -1 \\ 0 \\ \frac{L}{t_{go}} \\ \frac{2A}{t_{go}} \end{bmatrix} = \begin{bmatrix} x_2 \\ \frac{2x_2}{x_5} - \frac{\eta M_{\perp,az}}{x_6 x_5} \\ x_4 \\ \frac{2x_4}{x_5} - \frac{\eta M_{\perp,el}}{x_6 x_5} \\ -1 \\ 0 \\ x_7 \frac{1}{x_5} \\ 2x_8 \frac{1}{x_5} \end{bmatrix}$$

In order to better understand aspects of the present disclosure, a discussion of the derivation of the Kalman Filters and related state equations is provided.

Common Derivations

Line of Sight Rate And Its Derivative

In order to obtain the state equations for a Line of Sight/Line of Sight Rate (LOS/LOSR) filter, the second derivative of the equation for arc length is taken to obtain the equation for tangential acceleration.

$$S = \lambda R \qquad \text{Eq. A1}$$

$$\ddot{S} = \ddot{\lambda} R + 2\dot{\lambda}\dot{R} + \lambda\ddot{R} \qquad \text{Eq. A2}$$

Tangential acceleration (S̈) is equal to the total acceleration (from both interceptor and target) perpendicular to the LOS.

$$\Delta \eta_{\perp_{LOS}} = \ddot{\lambda}R + 2\dot{\lambda}\dot{R} + \lambda\ddot{R} = \eta_{M_\perp} - \eta_{T_\perp} \quad \text{Eq. A3}$$

If it is assumed that the target is non-maneuvering ($\eta_{T_\perp} \approx 0$), and the change in closing velocity is very small ($\ddot{R} \approx 0$), then:

$$\ddot{\lambda} = -\frac{2\dot{\lambda}\dot{R}}{R} + \frac{\eta_{M_\perp}}{R} \quad \text{Eq. A4}$$

As it was assumed that the change in closing velocity is negligible, then the following holds:

$$R = \dot{R}T_{go} \quad \text{Eq. A5}$$

and substituting Eq. A5 into Eq. A4 provides:

$$\ddot{\lambda} = \frac{2\dot{\lambda}}{T_{go}} + \frac{\eta_{M_\perp}}{\dot{R}T_{go}} \quad \text{Eq. A6}$$

True Irradiance and its Derivative

The true irradiance of an object at a distance R and intensity I is given by:

$$J = \frac{I}{R^2} \quad \text{Eq. A7}$$

Taking the time derivative of Eq. A7 yields:

$$\frac{d}{dt}(J) = \dot{J} = \frac{\dot{I}}{R^2} - \frac{2I}{R^2}\frac{\dot{R}}{R} = \frac{\dot{I}}{R^2} - 2J\frac{\dot{R}}{R} \quad \text{Eq. A8}$$

For a constant intensity model, İ=0. Therefore, any changes in irradiance are attributed to range closure. Furthermore, for a constant closing velocity condition ($\ddot{R} \approx 0$, $R \approx -\dot{R}t_{go}$), Eq. A8 can also be written as:

$$\dot{J} = 2J\frac{1}{t_{go}} \quad \text{Eq. A9}$$

True Area and its Derivative

The current area of an object at a distance R as it relates to a previous area and distance is given by:

$$A = \frac{R_o^2 A_o}{R^2} \quad \text{Eq. A10}$$

Taking the time derivative of Eq. A10 yields:

$$\frac{d}{dt}(A) = \dot{A} = -\frac{2R_o^2 A_o \dot{R}}{R^3} = \frac{2A}{t_{go}} \quad \text{Eq. A11}$$

True Length and its Derivative

The current length of an object at a distance R as it relates to a previous length and distance is given by:

$$L = \frac{R_o L_o}{R} \quad \text{Eq. A12}$$

and taking the time derivative of Eq. A12 yields:

$$\frac{d}{dt}(L) = \dot{L} = -\frac{R_o L_o \dot{R}}{R^2} = \frac{L}{t_{go}} \quad \text{Eq. A13}$$

Measurement Models

Irradiance Measurement Model

The irradiance measurement can be summarized as:

$$J_{meas} = (1+J_{SF})J + J_b + J_{RN} \quad \text{Eq. B1}$$

where $J_{SF}$ is the irradiance scale factor error, $J_b$ is the irradiance bias error, and $J_{RN}$ is the irradiance random noise.

Mapping Kalman Frame LOS Angles to Seeker Boresight Errors

Figure 6:
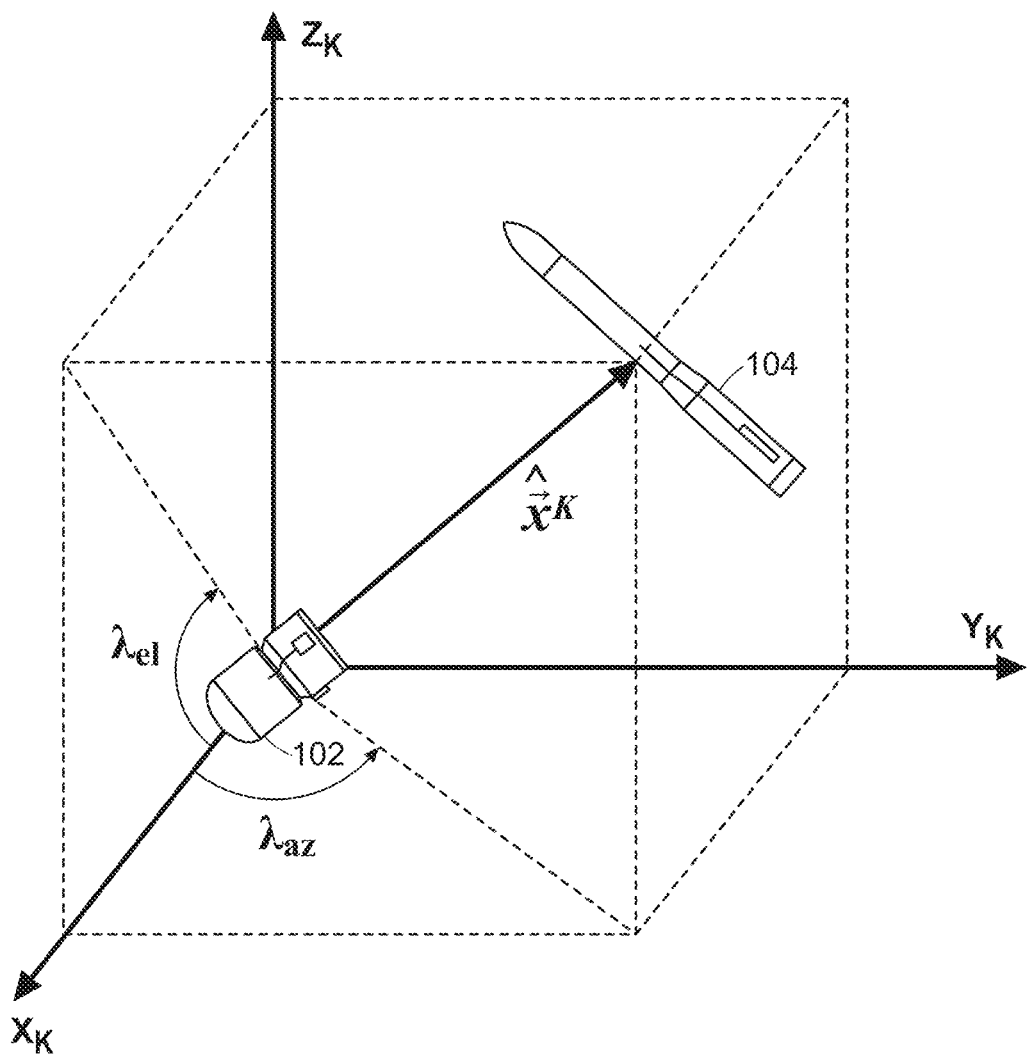
FIG. 6 is a representation of mapping Kalman Frame Line-of-Sight (LOS) Angles to Seeker Boresight Errors.

With reference to FIG. 6, the unit vector to the target in the seeker frame as a function of the boresight errors $\varepsilon_{az}$ and $\varepsilon_{el}$ (assuming small angles) is:

$$\vec{u}^S = \frac{1}{\sqrt{1+\tan(\varepsilon_{az})^2+\tan(\varepsilon_{el})^2}} \begin{bmatrix} 1 \\ \tan(\varepsilon_{az}) \\ -\tan(\varepsilon_{el}) \end{bmatrix} \approx \begin{bmatrix} 1 \\ \varepsilon_{az} \\ -\varepsilon_{el} \end{bmatrix} \quad \text{Eq. B2}$$

The tracker performs state estimation in the inertial Kalman Frame. The missile-to-target unit vector in the Kalman Frame as a function of the LOS angles $\lambda_{az}$ and $\lambda_{el}$ (assuming small angles) is:

$$\vec{u}^K = \frac{1}{\sqrt{1+\tan(\lambda_{az})^2+\tan(\lambda_{el})^2}} \begin{bmatrix} 1 \\ \tan(\lambda_{az}) \\ -\tan(\lambda_{el}) \end{bmatrix} \approx \begin{bmatrix} 1 \\ \lambda_{az} \\ -\lambda_{el} \end{bmatrix} \quad \text{Eq. B3}$$

and the Kalman-to-Seeker DCM is defined as:

$$C_K^S = \begin{bmatrix} c_{11} & c_{12} & c_{13} \\ c_{21} & c_{22} & c_{23} \\ c_{31} & c_{32} & c_{33} \end{bmatrix} \quad \text{Eq. B4}$$

To rotate the missile-to-target position vector from the Kalman frame to the seeker frame:

$$\vec{u}^S = C_K^S \vec{u}^K \quad \text{Eq. B5}$$

$$\underbrace{\begin{bmatrix} 1 \\ \varepsilon_{az} \\ -\varepsilon_{el} \end{bmatrix}}_{=\vec{u}^S} = C_K^S \underbrace{\begin{bmatrix} 1 \\ \lambda_{az} \\ -\lambda_{el} \end{bmatrix}}_{=\vec{u}^K} = \begin{bmatrix} c_{11}+c_{12}\lambda_{az}-c_{13}\lambda_{el} \\ c_{21}+c_{22}\lambda_{az}-c_{23}\lambda_{el} \\ c_{31}+c_{32}\lambda_{az}-c_{33}\lambda_{el} \end{bmatrix}$$

and the linearized observation matrix is then given by:

$$H = \begin{bmatrix} \frac{\partial \varepsilon_{az}}{\partial \lambda_{az}} & \frac{\partial \varepsilon_{az}}{\partial \lambda_{el}} \\ \frac{\partial \varepsilon_{el}}{\partial \lambda_{az}} & \frac{\partial \varepsilon_{el}}{\partial \lambda_{el}} \end{bmatrix} = \begin{bmatrix} c_{22} & -c_{23} \\ -c_{32} & c_{33} \end{bmatrix} \quad \text{Eq. B6}$$

Modified Irradiance Coupled Los/Los Rate Passive Ranging

Kalman Filter State Vector (Prior to Image Resolution)

This filter formulation couples various states (LOS, LOS rate, $t_{go}$, range rate and irradiance) to maximize observability for passive ranging and this state vector is expressed as:

$$\vec{x} [\lambda_{az} \dot{\lambda}_{az} \lambda_{el} \dot{\lambda}_{el} t_{go} \dot{r} J J_b]^T \quad \text{Eq. C1a}$$

where $J_b$ is the irradiance bias.

Now, taking the derivative of Eq. C1a (and using Eq. A6 and Eq. A9) results in:

$$f(\vec{x},u) = \dot{\vec{x}} = \begin{bmatrix} \dot{\lambda}_{az} \\ \ddot{\lambda}_{az} \\ \dot{\lambda}_{el} \\ \ddot{\lambda}_{el} \\ \dot{t}_{go} \\ \ddot{r} \\ \dot{J} \\ \dot{j}_b \end{bmatrix} = \begin{bmatrix} \dot{\lambda}_{az} \\ \frac{2\dot{\lambda}_{az}}{t_{go}} - \frac{\eta_{M_\perp,az}}{\dot{r} t_{go}} \\ \dot{\lambda}_{el} \\ \frac{2\dot{\lambda}_{el}}{t_{go}} - \frac{\eta_{M_\perp,el}}{\dot{r} t_{go}} \\ -1 \\ 0 \\ 2J\frac{1}{t_{go}} \\ 0 \end{bmatrix} = \begin{bmatrix} x_2 \\ \frac{2x_2}{x_5} - \frac{\eta_{M_\perp,az}}{x_6 x_5} \\ x_4 \\ \frac{2x_4}{x_5} - \frac{\eta_{M_\perp,el}}{x_6 x_5} \\ -1 \\ 0 \\ 2x_7 \frac{1}{x_5} \\ 0 \end{bmatrix} \quad \text{Eq. C2a}$$

Kalman Filter State Vector (Post Image Resolution)

This filter formulation couples various states (LOS, LOS rate, $t_{go}$, range rate, target length and target area) to maximize observability for passive ranging and this state vector is expressed as:

$$\vec{x} [\lambda_{az} \dot{\lambda}_{az} \lambda_{el} \dot{\lambda}_{el} t_{go} \dot{r} L A]^T \quad \text{Eq. C1b}$$

where $J_b$ is the irradiance bias.

Now, taking the derivative of Eq. C1b (and using Eq. A6 and Eq. A9) results in:

$$f(\vec{x},u) = \dot{\vec{x}} = \begin{bmatrix} \dot{\lambda}_{az} \\ \ddot{\lambda}_{az} \\ \dot{\lambda}_{el} \\ \ddot{\lambda}_{el} \\ \dot{t}_{go} \\ \ddot{r} \\ \dot{L} \\ \dot{A} \end{bmatrix} = \begin{bmatrix} \dot{\lambda}_{az} \\ \frac{2\dot{\lambda}_{az}}{t_{go}} - \frac{\eta_{M_\perp,az}}{\dot{r} t_{go}} \\ \dot{\lambda}_{el} \\ \frac{2\dot{\lambda}_{el}}{t_{go}} - \frac{\eta_{M_\perp,el}}{\dot{r} t_{go}} \\ -1 \\ 0 \\ \frac{L}{t_{go}} \\ \frac{2A}{t_{go}} \end{bmatrix} = \begin{bmatrix} x_2 \\ \frac{2x_2}{x_5} - \frac{\eta_{M_\perp,az}}{x_6 x_5} \\ x_4 \\ \frac{2x_4}{x_5} - \frac{\eta_{M_\perp,el}}{x_6 x_5} \\ -1 \\ 0 \\ x_7 \frac{1}{x_5} \\ 2x_8 \frac{1}{x_5} \end{bmatrix} \quad \text{Eq. C2b}$$

Linearized State Dynamics Matrix and State Transition Matrix (Prior to Image Resolution)

The linearized state dynamics matrix is given by:

$$F = \frac{\partial f(\vec{x},\vec{u})}{\partial \vec{x}} = \quad \text{Eq. C3a}$$

$$\begin{bmatrix} \frac{\partial \dot{\lambda}_{az}}{\partial x_1} & \frac{\partial \dot{\lambda}_{az}}{\partial x_2} & \frac{\partial \dot{\lambda}_{az}}{\partial x_3} & \frac{\partial \dot{\lambda}_{az}}{\partial x_4} & \frac{\partial \dot{\lambda}_{az}}{\partial x_5} & \frac{\partial \dot{\lambda}_{az}}{\partial x_6} & \frac{\partial \dot{\lambda}_{az}}{\partial x_7} & \frac{\partial \dot{\lambda}_{az}}{\partial x_8} \\ \frac{\partial \ddot{\lambda}_{az}}{\partial x_1} & \frac{\partial \ddot{\lambda}_{az}}{\partial x_2} & \frac{\partial \ddot{\lambda}_{az}}{\partial x_3} & \frac{\partial \ddot{\lambda}_{az}}{\partial x_4} & \frac{\partial \ddot{\lambda}_{az}}{\partial x_5} & \frac{\partial \ddot{\lambda}_{az}}{\partial x_6} & \frac{\partial \ddot{\lambda}_{az}}{\partial x_7} & \frac{\partial \ddot{\lambda}_{az}}{\partial x_8} \\ \frac{\partial \dot{\lambda}_{el}}{\partial x_1} & \frac{\partial \dot{\lambda}_{el}}{\partial x_2} & \frac{\partial \dot{\lambda}_{el}}{\partial x_3} & \frac{\partial \dot{\lambda}_{el}}{\partial x_4} & \frac{\partial \dot{\lambda}_{el}}{\partial x_5} & \frac{\partial \dot{\lambda}_{el}}{\partial x_6} & \frac{\partial \dot{\lambda}_{el}}{\partial x_7} & \frac{\partial \dot{\lambda}_{el}}{\partial x_8} \\ \frac{\partial \ddot{\lambda}_{el}}{\partial x_1} & \frac{\partial \ddot{\lambda}_{el}}{\partial x_2} & \frac{\partial \ddot{\lambda}_{el}}{\partial x_3} & \frac{\partial \ddot{\lambda}_{el}}{\partial x_4} & \frac{\partial \ddot{\lambda}_{el}}{\partial x_5} & \frac{\partial \ddot{\lambda}_{el}}{\partial x_6} & \frac{\partial \ddot{\lambda}_{el}}{\partial x_7} & \frac{\partial \ddot{\lambda}_{el}}{\partial x_8} \\ \frac{\partial \dot{t}_{go}}{\partial x_1} & \frac{\partial \dot{t}_{go}}{\partial x_2} & \frac{\partial \dot{t}_{go}}{\partial x_3} & \frac{\partial \dot{t}_{go}}{\partial x_4} & \frac{\partial \dot{t}_{go}}{\partial x_5} & \frac{\partial \dot{t}_{go}}{\partial x_6} & \frac{\partial \dot{t}_{go}}{\partial x_7} & \frac{\partial \dot{t}_{go}}{\partial x_8} \\ \frac{\partial \ddot{r}}{\partial x_1} & \frac{\partial \ddot{r}}{\partial x_2} & \frac{\partial \ddot{r}}{\partial x_3} & \frac{\partial \ddot{r}}{\partial x_4} & \frac{\partial \ddot{r}}{\partial x_5} & \frac{\partial \ddot{r}}{\partial x_6} & \frac{\partial \ddot{r}}{\partial x_7} & \frac{\partial \ddot{r}}{\partial x_8} \\ \frac{\partial \dot{J}}{\partial x_1} & \frac{\partial \dot{J}}{\partial x_2} & \frac{\partial \dot{J}}{\partial x_3} & \frac{\partial \dot{J}}{\partial x_4} & \frac{\partial \dot{J}}{\partial x_5} & \frac{\partial \dot{J}}{\partial x_6} & \frac{\partial \dot{J}}{\partial x_7} & \frac{\partial \dot{J}}{\partial x_8} \\ \frac{\partial \dot{j}_b}{\partial x_1} & \frac{\partial \dot{j}_b}{\partial x_2} & \frac{\partial \dot{j}_b}{\partial x_3} & \frac{\partial \dot{j}_b}{\partial x_4} & \frac{\partial \dot{j}_b}{\partial x_5} & \frac{\partial \dot{j}_b}{\partial x_6} & \frac{\partial \dot{j}_b}{\partial x_7} & \frac{\partial \dot{j}_b}{\partial x_8} \end{bmatrix} =$$

$$\begin{bmatrix} 0 & 1 & 0 & 0 & 0 & 0 & 0 & 0 \\ 0 & \frac{\partial \ddot{\lambda}_{az}}{\partial x_2} & 0 & 0 & \frac{\partial \ddot{\lambda}_{az}}{\partial x_5} & \frac{\partial \ddot{\lambda}_{az}}{\partial x_6} & 0 & 0 \\ 0 & 0 & 0 & 1 & 0 & 0 & 0 & 0 \\ 0 & 0 & 0 & \frac{\partial \ddot{\lambda}_{el}}{\partial x_4} & \frac{\partial \ddot{\lambda}_{el}}{\partial x_5} & \frac{\partial \ddot{\lambda}_{el}}{\partial x_6} & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & \frac{\partial \dot{J}}{\partial x_5} & 0 & \frac{\partial \dot{J}}{\partial x_7} & 0 \\ 0 & 0 & 0 & 0 & 0 & 0 & 0 & 0 \end{bmatrix}$$

and the remaining non-zero terms of the linearized state dynamics matrix are given by:

$$\frac{\partial \ddot{\lambda}_{az}}{\partial x_2} = \frac{2}{x_5} \quad \text{Eq. C4a}$$

$$\frac{\partial \ddot{\lambda}_{el}}{\partial x_5} = -\frac{2x_4}{x_5^2} + \frac{\eta_{M_\perp,el}}{x_6 x_5^2}$$

$$\frac{\partial \ddot{\lambda}_{az}}{\partial x_5} = -\frac{2x_2}{x_5^2} + \frac{\eta_{M_\perp,az}}{x_6 x_5^2}$$

$$\frac{\partial \ddot{\lambda}_{el}}{\partial x_6} = \frac{\eta_{M_\perp,el}}{x_6^2 x_5}$$

$$\frac{\partial \ddot{\lambda}_{az}}{\partial x_6} = \frac{\eta_{M_\perp,az}}{x_6^2 x_5}$$

$$\frac{\partial \dot{J}}{\partial x_5} = -\frac{2x_7}{x_5^2}$$

$$\frac{\partial \dot{\lambda}_{el}}{\partial x_4} = \frac{2}{x_5}$$

$$\frac{\partial \dot{J}}{\partial x_7} = \frac{2}{x_5}$$

A two term Taylor series expansion is used to obtain the state transition matrix:

$$\Phi_k \approx I + F \cdot T_s \qquad \text{Eq. C5a}$$

where $T_s$ is the sampling time.

Linearized State Dynamics Matrix and State Transition Matrix (Post Image Resolution)

The linearized state dynamics matrix is given by:

$$F = \frac{\partial f(\vec{x}, \vec{u})}{\partial \vec{x}} = \qquad \text{Eq. C3a}$$

$$\begin{bmatrix} \frac{\partial \dot{\lambda}_{az}}{\partial x_1} & \frac{\partial \dot{\lambda}_{az}}{\partial x_2} & \frac{\partial \dot{\lambda}_{az}}{\partial x_3} & \frac{\partial \dot{\lambda}_{az}}{\partial x_4} & \frac{\partial \dot{\lambda}_{az}}{\partial x_5} & \frac{\partial \dot{\lambda}_{az}}{\partial x_6} & \frac{\partial \dot{\lambda}_{az}}{\partial x_7} & \frac{\partial \dot{\lambda}_{az}}{\partial x_8} \\ \frac{\partial \ddot{\lambda}_{az}}{\partial x_1} & \frac{\partial \ddot{\lambda}_{az}}{\partial x_2} & \frac{\partial \ddot{\lambda}_{az}}{\partial x_3} & \frac{\partial \ddot{\lambda}_{az}}{\partial x_4} & \frac{\partial \ddot{\lambda}_{az}}{\partial x_5} & \frac{\partial \ddot{\lambda}_{az}}{\partial x_6} & \frac{\partial \ddot{\lambda}_{az}}{\partial x_7} & \frac{\partial \ddot{\lambda}_{az}}{\partial x_8} \\ \frac{\partial \dot{\lambda}_{el}}{\partial x_1} & \frac{\partial \dot{\lambda}_{el}}{\partial x_2} & \frac{\partial \dot{\lambda}_{el}}{\partial x_3} & \frac{\partial \dot{\lambda}_{el}}{\partial x_4} & \frac{\partial \dot{\lambda}_{el}}{\partial x_5} & \frac{\partial \dot{\lambda}_{el}}{\partial x_6} & \frac{\partial \dot{\lambda}_{el}}{\partial x_7} & \frac{\partial \dot{\lambda}_{el}}{\partial x_8} \\ \frac{\partial \ddot{\lambda}_{el}}{\partial x_1} & \frac{\partial \ddot{\lambda}_{el}}{\partial x_2} & \frac{\partial \ddot{\lambda}_{el}}{\partial x_3} & \frac{\partial \ddot{\lambda}_{el}}{\partial x_4} & \frac{\partial \ddot{\lambda}_{el}}{\partial x_5} & \frac{\partial \ddot{\lambda}_{el}}{\partial x_6} & \frac{\partial \ddot{\lambda}_{el}}{\partial x_7} & \frac{\partial \ddot{\lambda}_{el}}{\partial x_8} \\ \frac{\partial \dot{i}_{go}}{\partial x_1} & \frac{\partial \dot{i}_{go}}{\partial x_2} & \frac{\partial \dot{i}_{go}}{\partial x_3} & \frac{\partial \dot{i}_{go}}{\partial x_4} & \frac{\partial \dot{i}_{go}}{\partial x_5} & \frac{\partial \dot{i}_{go}}{\partial x_6} & \frac{\partial \dot{i}_{go}}{\partial x_7} & \frac{\partial \dot{i}_{go}}{\partial x_8} \\ \frac{\partial \dot{r}}{\partial x_1} & \frac{\partial \dot{r}}{\partial x_2} & \frac{\partial \dot{r}}{\partial x_3} & \frac{\partial \dot{r}}{\partial x_4} & \frac{\partial \dot{r}}{\partial x_5} & \frac{\partial \dot{r}}{\partial x_6} & \frac{\partial \dot{r}}{\partial x_7} & \frac{\partial \dot{r}}{\partial x_8} \\ \frac{\partial \dot{L}}{\partial x_1} & \frac{\partial \dot{L}}{\partial x_2} & \frac{\partial \dot{L}}{\partial x_3} & \frac{\partial \dot{L}}{\partial x_4} & \frac{\partial \dot{L}}{\partial x_5} & \frac{\partial \dot{L}}{\partial x_6} & \frac{\partial \dot{L}}{\partial x_7} & \frac{\partial \dot{L}}{\partial x_8} \\ \frac{\partial \dot{A}}{\partial x_1} & \frac{\partial \dot{A}}{\partial x_2} & \frac{\partial \dot{A}}{\partial x_3} & \frac{\partial \dot{A}}{\partial x_4} & \frac{\partial \dot{A}}{\partial x_5} & \frac{\partial \dot{A}}{\partial x_6} & \frac{\partial \dot{A}}{\partial x_7} & \frac{\partial \dot{A}}{\partial x_8} \end{bmatrix} =$$

$$\begin{bmatrix} 0 & 1 & 0 & 0 & 0 & 0 & 0 & 0 \\ 0 & \frac{\partial \ddot{\lambda}_{az}}{\partial x_2} & 0 & 0 & \frac{\partial \ddot{\lambda}_{az}}{\partial x_5} & \frac{\partial \ddot{\lambda}_{az}}{\partial x_6} & 0 & 0 \\ 0 & 0 & 0 & 1 & 0 & 0 & 0 & 0 \\ 0 & 0 & 0 & \frac{\partial \ddot{\lambda}_{el}}{\partial x_4} & \frac{\partial \ddot{\lambda}_{el}}{\partial x_5} & \frac{\partial \ddot{\lambda}_{el}}{\partial x_6} & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & \frac{\partial \dot{J}}{\partial x_5} & 0 & \frac{\partial \dot{J}}{\partial x_7} & 0 \\ 0 & 0 & 0 & 0 & \frac{\partial \dot{A}}{\partial x_5} & 0 & 0 & \frac{\partial \dot{A}}{\partial x_8} \end{bmatrix}$$

The remaining non-zero terms of the linearized state dynamics matrix are given by:

$$\frac{\partial \ddot{\lambda}_{az}}{\partial x_2} = \frac{2}{x_5} \qquad \text{Eq. C4a}$$

$$\frac{\partial \ddot{\lambda}_{el}}{\partial x_5} = -\frac{2x_4}{x_5^2} + \frac{\eta M_{\perp,el}}{x_6 x_5^2}$$

$$\frac{\partial \ddot{\lambda}_{az}}{\partial x_5} = -\frac{2x_2}{x_5^2} + \frac{\eta M_{\perp,az}}{x_6 x_5^2}$$

$$\frac{\partial \ddot{\lambda}_{el}}{\partial x_6} = \frac{\eta M_{\perp,el}}{x_6^2 x_5}$$

$$\frac{\partial \dot{A}}{\partial x_5} = -\frac{2x_8}{x_5^2}$$

$$\frac{\partial \ddot{\lambda}_{az}}{\partial x_6} = \frac{\eta M_{\perp,az}}{x_6^2 x_5}$$

$$\frac{\partial \dot{L}}{\partial x_5} = -\frac{x_7}{x_5^2}$$

$$\frac{\partial \dot{A}}{\partial x_8} = \frac{2}{x_5}$$

$$\frac{\partial \dot{\lambda}_{el}}{\partial x_4} = \frac{2}{x_5}$$

$$\frac{\partial \dot{L}}{\partial x_7} = \frac{1}{x_5}$$

A two term Taylor series expansion is used to obtain the state transition matrix:

$$\Phi_k \approx I + F \cdot T_s \qquad \text{Eq. C5a}$$

where $T_s$ is the sampling time.

Process Noise Matrix

The continuous process noise matrix is given by:

$$\vec{w} = [w_1 w_2 w_3 w_4 w_5 w_6 w_7 w_8]^T$$

$$Q = E[\vec{w} \vec{w}^T] \qquad \text{Eq. C6}$$

The discrete process noise matrix is given by:

$$Q_k = \int_0^{T_s} \Phi(\tau) Q \Phi^T(\tau) d\tau \qquad \text{Eq. C7}$$

Measurements, Predicted Measurements, and Linearized Observation Matrix (Prior to Image Resolution)

The measurement vector is given by:

$$\vec{Z} = [\epsilon_{az} \epsilon_{el} J]^T \qquad \text{Eq. C8a}$$

The predicted measurements in terms of the state vector are (refer to Eqs.

$$h(\hat{\vec{X}}_{k|k-1}) = [\hat{\epsilon}_{az} \hat{\epsilon}_{el} \hat{J}]^T$$

$$\hat{\epsilon}_{az} = c_{21} + c_{22} \lambda_{az} - c_{23} \lambda_{el}$$

$$\hat{\epsilon}_{el} = -(c_{31} + c_{32} \lambda_{az} - c_{33} \lambda_{el})$$

$$\hat{J} = J + J_b, \qquad \text{Eq. C9a}$$

where the $c_{ij}$'s are the components of the Kalman-to-Seeker DCM (see Eq. B4).

The linearized observation matrix is then given by:

$$H = \frac{\partial h(\hat{\vec{x}}_{k|k-1})}{\partial \hat{\vec{x}}_{k|k-1}} = \qquad \text{Eq. C10a}$$

-continued $$\begin{bmatrix} \frac{\partial \hat{\varepsilon}_{az}}{\partial x_1} & \frac{\partial \hat{\varepsilon}_{az}}{\partial x_2} & \frac{\partial \hat{\varepsilon}_{az}}{\partial x_3} & \frac{\partial \hat{\varepsilon}_{az}}{\partial x_4} & \frac{\partial \hat{\varepsilon}_{az}}{\partial x_5} & \frac{\partial \hat{\varepsilon}_{az}}{\partial x_6} & \frac{\partial \hat{\varepsilon}_{az}}{\partial x_7} & \frac{\partial \hat{\varepsilon}_{az}}{\partial x_8} \\ \frac{\partial \hat{\varepsilon}_{el}}{\partial x_1} & \frac{\partial \hat{\varepsilon}_{el}}{\partial x_2} & \frac{\partial \hat{\varepsilon}_{el}}{\partial x_3} & \frac{\partial \hat{\varepsilon}_{el}}{\partial x_4} & \frac{\partial \hat{\varepsilon}_{el}}{\partial x_5} & \frac{\partial \hat{\varepsilon}_{el}}{\partial x_6} & \frac{\partial \hat{\varepsilon}_{el}}{\partial x_7} & \frac{\partial \hat{\varepsilon}_{el}}{\partial x_8} \\ \frac{\partial \hat{J}}{\partial x_1} & \frac{\partial \hat{J}}{\partial x_2} & \frac{\partial \hat{J}}{\partial x_3} & \frac{\partial \hat{J}}{\partial x_4} & \frac{\partial \hat{J}}{\partial x_5} & \frac{\partial \hat{J}}{\partial x_6} & \frac{\partial \hat{J}}{\partial x_7} & \frac{\partial \hat{J}}{\partial x_8} \end{bmatrix} =$$

$$\begin{bmatrix} c_{22} & 0 & -c_{23} & 0 & 0 & 0 & 0 & 0 \\ -c_{32} & 0 & c_{33} & 0 & 0 & 0 & 0 & 0 \\ 0 & 0 & 0 & 0 & 0 & 0 & 1 & 1 \end{bmatrix}$$

Measurements, Predicted Measurements, and Linearized Observation Matrix (Post Image Resolution)

The measurement vector is given by:

$$\vec{z} = [\varepsilon_{az} \, \varepsilon_{el} \, L \, A]^T \qquad \text{Eq. C8b}$$

The predicted measurements in terms of the state vector are (referring to Eqs. B1, B4 and B5):

$$h(\hat{\vec{X}}_{k|k-1}) = [\hat{\varepsilon}_{az} \, \hat{\varepsilon}_{el} \, \hat{L} \, \hat{A}]^T$$

$$\hat{\varepsilon}_{az} = c_{21} + c_{22}\lambda_{az} - c_{23}\lambda_{el}$$

$$\hat{\varepsilon}_{el} = -(c_{31} + c_{32}\lambda_{az} - c_{33}\lambda_{el})$$

$$\hat{L} = L$$

$$\hat{A} = A4 \qquad \text{Eq. C9b}$$

where the $c_{ij}$'s are the components of the Kalman-to-Seeker DCM (see Eq. B4).

The linearized observation matrix is given by:

$$H = \frac{\partial h(\hat{x}_{k|k-1})}{\partial \hat{\vec{x}}_{k|k-1}} = \qquad \text{Eq. C10b}$$

$$\begin{bmatrix} \frac{\partial \hat{\varepsilon}_{az}}{\partial x_1} & \frac{\partial \hat{\varepsilon}_{az}}{\partial x_2} & \frac{\partial \hat{\varepsilon}_{az}}{\partial x_3} & \frac{\partial \hat{\varepsilon}_{az}}{\partial x_4} & \frac{\partial \hat{\varepsilon}_{az}}{\partial x_5} & \frac{\partial \hat{\varepsilon}_{az}}{\partial x_6} & \frac{\partial \hat{\varepsilon}_{az}}{\partial x_7} & \frac{\partial \hat{\varepsilon}_{az}}{\partial x_8} \\ \frac{\partial \hat{\varepsilon}_{el}}{\partial x_1} & \frac{\partial \hat{\varepsilon}_{el}}{\partial x_2} & \frac{\partial \hat{\varepsilon}_{el}}{\partial x_3} & \frac{\partial \hat{\varepsilon}_{el}}{\partial x_4} & \frac{\partial \hat{\varepsilon}_{el}}{\partial x_5} & \frac{\partial \hat{\varepsilon}_{el}}{\partial x_6} & \frac{\partial \hat{\varepsilon}_{el}}{\partial x_7} & \frac{\partial \hat{\varepsilon}_{el}}{\partial x_8} \\ \frac{\partial \hat{L}}{\partial x_1} & \frac{\partial \hat{L}}{\partial x_2} & \frac{\partial \hat{L}}{\partial x_3} & \frac{\partial \hat{L}}{\partial x_4} & \frac{\partial \hat{L}}{\partial x_5} & \frac{\partial \hat{L}}{\partial x_6} & \frac{\partial \hat{L}}{\partial x_7} & \frac{\partial \hat{L}}{\partial x_8} \\ \frac{\partial \hat{A}}{\partial x_1} & \frac{\partial \hat{A}}{\partial x_2} & \frac{\partial \hat{A}}{\partial x_3} & \frac{\partial \hat{A}}{\partial x_4} & \frac{\partial \hat{A}}{\partial x_5} & \frac{\partial \hat{A}}{\partial x_6} & \frac{\partial \hat{A}}{\partial x_7} & \frac{\partial \hat{A}}{\partial x_8} \end{bmatrix} =$$

$$\begin{bmatrix} c_{22} & 0 & -c_{23} & 0 & 0 & 0 & 0 & 0 \\ -c_{32} & 0 & c_{33} & 0 & 0 & 0 & 0 & 0 \\ 0 & 0 & 0 & 0 & 0 & 0 & 1 & 0 \\ 0 & 0 & 0 & 0 & 0 & 0 & 0 & 1 \end{bmatrix}$$

EKF Propagate/Update Equations

The state equations are propagated by any suitable integration method such as Runge-Kutta or Euler integration (Euler integration shown below). Thus the state vector x is propagated according to:

$$\hat{\vec{x}}_{k|k-1} = \hat{\vec{x}}_{k-1|k-1} + \int_{t_{k-1}}^{t_k} \hat{\vec{x}}(\tau) d\tau \cong \hat{\vec{x}}_{k-1|k-1} + \hat{\dot{\vec{x}}}_{k-1|k-1} \cdot T_s \qquad \text{Eq. C11}$$

The covariance matrix P is propagated according to:

$$P_{k|k-1} = \Phi_k P_{k-1|k-1} \Phi_k^T + Q_k \qquad \text{Eq. C12}$$

The measurement residual and corresponding covariance are given by:

$$\vec{\tilde{y}} = \vec{z}_k - h(\hat{\vec{X}}_{k|k-1}) \qquad \text{Eq. C13}$$

It should be noted that the components on the right side of Eq. C13 have to be time-aligned. The state vector has to be propagated to the "time of validity" (TOV) of the measurement z. Generally, when a sensor provides a measurement, it also provides a TOV, i.e., a "time stamp," indicating the time at which the measurement was made in order to be used to indicate when it is valid.

$$S_k = H_k P_{k|k-1} H_k^T + R_k \qquad \text{Eq. C14}$$

The optimal Kalman gain is given by:

$$K_k = P_{k|k-1} H_k^T S_k^{-1} \qquad \text{Eq. C15}$$

Lastly, the updated state vector and corresponding covariance are given by:

$$\hat{\vec{x}}_{k|k} = \hat{\vec{x}}_{k|k-1} + K_k \vec{\tilde{y}}_k \qquad \text{Eq. C16}$$

$$P_{k|k} = (I - K_k H_k) P_{k|k-1} = (I - K_k H_k) P_{k|k-1} (I - K_k H_k)^T + K_k R_k K_k^T \qquad \text{Eq. C17}$$

Figure 7A:
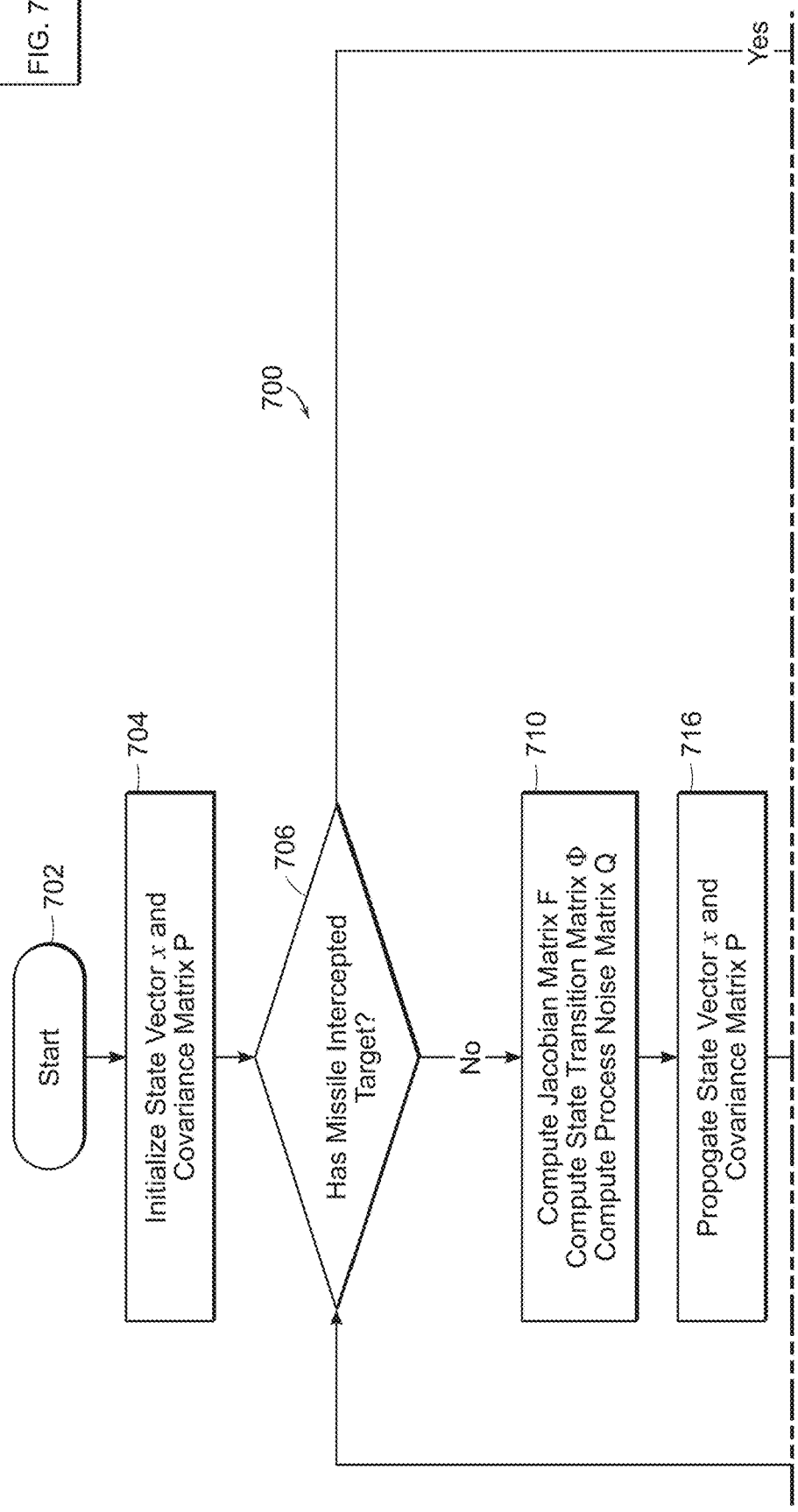
FIG. 7 is a flowchart of a method of passive ranging determination in accordance with an aspect of the present disclosure.
Figure 7B:
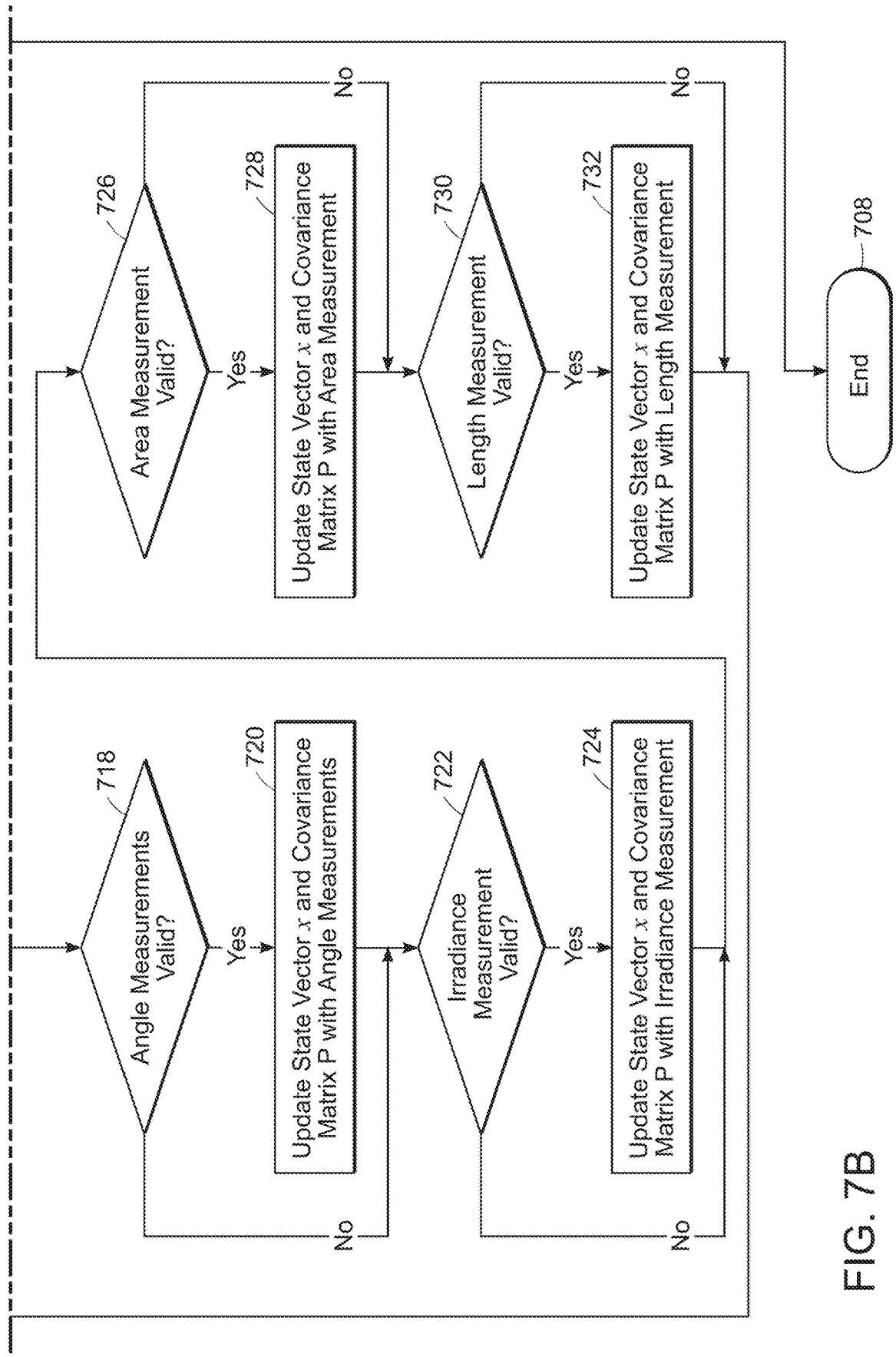

A method 700 of passive ranging estimation, implemented in the passive ranging target state estimator 306, and in accordance with an aspect of the present disclosure, is presented in FIG. 7. Once started, step 702, the state vector x and covariance matrix P are initialized, step 704. At step 706, a determination is made as to whether the target 104 has been intercepted. If interception has occurred, then control passes to the end, step 708. Effectively, at "interception" both the interceptor 102 and target 104 are destroyed. As the exemplary embodiment is implemented onboard the interceptor 102, the "yes" branch from step 706 would not occur but is included for completeness.

If the target 104 has not been intercepted, control passes to step 710 where the Jacobian matrix F, per Eqs. C3a and C4a above; the state transition matrix CD, per Eq. C5a above; and the process noise matrix Q, per Eqs. C6 and C7 above, are computed. Subsequently, at step 716, the state vector x and the covariance matrix P are propagated per Eq. C11 and Eq. C12, respectively.

As set forth above, the passive ranging target state estimator 306 receives output information from the signal processor 304 that includes indications of validity. Accordingly, at step 718, a determination is made as to the validity of the received angle measurements. If not valid, control passes to step 722. If the angle measurements are valid, control passes to step 720 where each of the state vector x, per Eqs. C8a-C10a, and the covariance matrix P, per Eqs. C13-C17, is updated with valid angle measurements, i.e., the first Kalman Filter is implemented.

At step 722, a determination is made as to the validity of the received irradiance measurements. If not valid, indicating that the target 104 is too close, i.e., not a point source, then control passes to step 726. If the received irradiance measurements are valid, i.e., far enough away to still be a point source, control passes to step 724 where each of the state vector x and the covariance matrix P is updated with valid irradiance measurements, i.e., the first Kalman Filter is implemented.

A determination is then made at step 726 as to the validity of the received area measurements. If not valid, i.e., a point source, control passes to step 730. If the area measurements are valid, i.e., close enough to be a resolved image, control passes to step 728 where each of the state vector x and the covariance matrix P is updated with valid area measurements, i.e., the second Kalman Filter is implemented.

If the length measurements are being used, an option as discussed above, and if determined valid at step 730, i.e., close enough to be a resolved image, then control passes to step 732 where each of the state vector x and the covariance matrix P is updated with valid length measurements, i.e., the second Kalman Filter is implemented. If the length measurements are not valid, then control passes back to step 706.

While the present disclosure uses an example of a missile defense system to describe its operation, the present system need not be used just for intercepting or defensive purposes and is, therefore, not to be construed as so limited.

Various implementations of the above-described systems and methods described may be provided in digital electronic circuitry, in computer hardware, firmware, and/or software. An implementation can be as a computer program product, e.g., a computer program tangibly embodied in an information carrier. The implementation can, for example, be in a machine-readable storage device, for execution by, or to control the operation of, data processing apparatus. The implementation can, for example, be a programmable processor, a computer, and/or multiple computers.

The above-described implementations generally depict a computer implemented system employing at least one processor or processing unit executing program steps out of at least one memory to obtain the functions herein described. It should be recognized that the presently described methods may be implemented via the use of software, firmware or alternatively, implemented as a dedicated hardware solution such as an FPGA (field programmable gate array) and/or an ASIC (application specific integrated circuit). Modules, subroutines, and software agents can refer to portions of the computer program, the processor or processing unit, the special circuitry, software, and/or hardware that implements that functionality.

Figure 8:
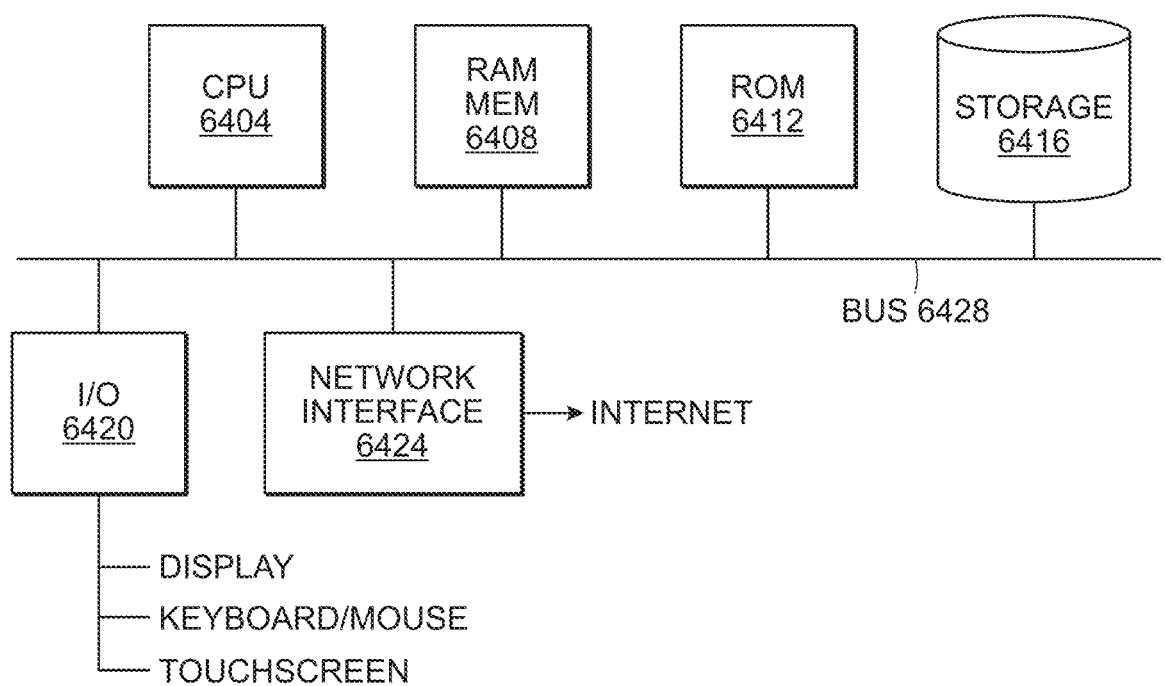
FIG. 8 is a block diagram of a computer system.

Referring to FIG. 8, the target state estimator 306 may be implemented as a system that may comprise a CPU 6404, RAM 6408, ROM 6412, a mass storage device 6416, for example, a disk drive, an I/O interface 6420 to couple to, for example, display, keyboard/mouse or touchscreen, or the like and a network interface module 6424. All of these modules are in communication with each other through a bus 6428. The CPU 6404 executes an operating system to operate and communicate with these various components.

A computer program can be written in any form of programming language, including compiled and/or interpreted languages, and the computer program can be deployed in any form, including as a stand-alone program or as a subroutine, element, and/or other unit suitable for use in a computing environment.

As utilized, the one or more processing units may represent, for example, a CPU-type processing unit, a GPU-type processing unit, a field-programmable gate array ("FPGA"), digital signal processor(s) ("DSP"), or other hardware logic components that may, in some instances, be driven by a central processing unit ("CPU").

The computer-readable medium may store instructions executable by the one or more processing units and may include computer storage media and/or communication media. Computer storage media may include one or more of volatile memory, nonvolatile memory, and/or other persistent and/or auxiliary computer storage media.

It is to be understood that the disclosure is not limited in its application to the details of construction and the arrangement of the components set forth herein or illustrated in the drawings as it is capable of implementations or of being practiced or carried out in various ways. Also, it is to be understood that the phraseology and terminology employed herein are for the purpose of description only and should not be regarded as limiting.

Certain features, which are, for clarity, described in the context of separate implementations, may also be provided in combination in a single implementation. Conversely, various features, which are, for brevity, described in the context of a single implementation, may also be provided separately or in any suitable sub-combination.

The present disclosure is illustratively described in reference to the disclosed implementations. Various modifications and changes may be made to the disclosed implementations by persons skilled in the art without departing from the scope of the present disclosure as defined in the appended claims.

What is claimed is:

1. A system for guiding an interceptor toward a target using passive ranging estimation, the system comprising:
   an EO/IR sensing device configured to:
      detect the target and output corresponding target azimuth information, target elevation information, target irradiance information, target length information, target area information and a respective validity indicator for each of the target azimuth information, target elevation information, target irradiance information, target length information and target area information;
      determine that the target irradiance information is valid and the target area information is invalid only when the target is detected as a point source; and
      determine that the target irradiance information is invalid and the target area information is valid only when an image of the target has been resolved,
      wherein the target area information and the target irradiance information cannot both be indicated as being valid at a same time;
   a passive ranging target state estimator, coupled to the EO/IR sensing device and configured to generate interceptor guidance information, comprising:
      a first Kalman Filter configured to generate the interceptor guidance information as a function of the target azimuth information, the target elevation information and the target irradiance information; and
      a second Kalman Filter configured to generate the interceptor guidance information as a function of the target azimuth information, the target elevation information and the target area information,
      wherein the first Kalman Filter is operative to generate the interceptor guidance information only when the target irradiance information is indicated as being valid,
      wherein the second Kalman Filter is operative to generate the interceptor guidance information only when the target area information is indicated as being valid; and
   an interceptor guidance module, coupled to the passive ranging target state estimator, configured to control movement of the interceptor as a function of the generated interceptor guidance information.

2. The system of claim 1, wherein the second Kalman Filter is further configured to generate the interceptor guidance information as a function of the target length information.

3. The system of claim 1, wherein the EO/IR sensing device is further configured to determine that the target is detected as a point source when the target is detected as a single pixel.

4. A method of guiding an interceptor toward a target using passive ranging estimation, the method comprising:
   detecting the target with an EO/IR sensing device and outputting corresponding target azimuth information, target elevation information, target irradiance information, target length information, target area information and a respective validity indicator for each of the target azimuth information, target elevation information, target irradiance information, target length information and target area information;
   determining a range from the interceptor to the target as a function of one or more of: the target azimuth information, target elevation information, target irradiance information, target length information, target area information and the respective validity indicators,
   determining that the range is greater than a first predetermined distance only when the target is detected by the EO/IR sensing device as being a point source; and
   determining that the range is less than or equal to the first predetermined distance only when the EO/IR sensing device has resolved an image of the target,
   wherein the EO/IR sensing device cannot have both detected the target as a point source and resolved the image of the target at the same time;
   generating interceptor guidance information by one of:
      when the determined range is greater than the first predetermined distance, implementing a first Kalman Filter configured to generate the interceptor guidance information as a function of the target azimuth information, the target elevation information and the target irradiance information; or
      when the determined range is less than or equal to the first predetermined distance, implementing a second Kalman Filter configured to provide the interceptor guidance information as a function of the target azimuth information, the target elevation information and the target area information; and
   controlling movement of the interceptor as a function of the generated interceptor guidance information.

5. The method of claim 4, wherein the second Kalman Filter is further configured to generate the interceptor guidance information as a function of the target length information.

6. The method of claim 4, wherein determining that the range is greater than the first predetermined distance, further comprises:
   indicating that the target irradiance information is valid and the target area information is invalid.

7. The method of claim 4, wherein determining that the range is less than or equal to the first predetermined distance further comprises:
   indicating that the target irradiance information is invalid and the target area information is valid.

8. The method of claim 4, wherein the EO/IR sensing device determines that the target is a point source when the target is detected as a single pixel.

9. A system for guiding an interceptor toward a target using passive ranging estimation, comprising:
   an EO/IR sensing device configured to detect the target and output corresponding target azimuth information, target elevation information, target irradiance information, target length information, target area information and a respective validity indicator for each of the target azimuth information, target elevation information, target irradiance information, target length information and target area information;
   a passive ranging target state estimator coupled to the EO/IR sensing device configured to:
      determine a range from the interceptor to the target as a function of one or more of: the target azimuth information, target elevation information, target irradiance information, target length information, target area information and the respective validity indicators;
      determine that the range is greater than a first predetermined distance only when the target is detected by the EO/IR sensing device as being a point source; and
      determine that the range is less than or equal to the first predetermined distance only when the EO/IR sensing device has resolved an image of the target,
      wherein the EO/IR sensing device cannot have both detected the target as a point source and resolved the image of the target at the same time;
   the passive ranging target state estimator further configured to generate interceptor guidance information by one of:
      when the determined range is greater than the first predetermined distance, implementing a first Kalman Filter configured to generate the interceptor guidance information as a function of the target azimuth information, the target elevation information and the target irradiance information; or
      when the determined range is less than or equal to the first predetermined distance, implementing a second Kalman Filter configured to provide the interceptor guidance information as a function of the target azimuth information, the target elevation information and the target area information; and
   an interceptor guidance control module, coupled to the passive ranging target state estimator, configured to control movement of the interceptor as a function of the generated interceptor guidance information.

10. The system of claim 9, wherein the second Kalman Filter is further configured to generate the interceptor guidance information as a function of the target length information.

11. The system of claim 9, wherein determining that the range is greater than the first predetermined distance further comprises:
   indicating that the target irradiance information is valid and the target area information is invalid.

12. The system of claim 9, wherein determining that the range is less than or equal to the first predetermined distance further comprises:
   indicating that the target irradiance information is invalid and the target area information is valid.

13. The system of claim 9, wherein the EO/IR sensing device is further configured to determine that the target is a point source when the target is detected as a single pixel.

* * * * *